United States Patent
Krco et al.

(10) Patent No.: US 8,526,364 B2
(45) Date of Patent: Sep. 3, 2013

(54) DELIVERING SYSTEM INFORMATION IN WIRELESS COMMUNICATIONS NETWORK

(75) Inventors: Srdjan Krco, Dublin (IE); Srdjan Kostic, Kista (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 278 days.

(21) Appl. No.: 12/747,915

(22) PCT Filed: Dec. 14, 2007

(86) PCT No.: PCT/EP2007/063992
§ 371 (c)(1),
(2), (4) Date: Oct. 4, 2010

(87) PCT Pub. No.: WO2009/076997
PCT Pub. Date: Jun. 25, 2009

(65) Prior Publication Data
US 2011/0019615 A1    Jan. 27, 2011

(51) Int. Cl.
*H04L 12/28* (2006.01)
*H04W 4/00* (2009.01)

(52) U.S. Cl.
USPC ........... 370/328; 370/252; 370/329; 370/352; 370/315; 455/450; 455/453; 455/458; 455/466; 455/436; 455/444

(58) Field of Classification Search
USPC .......................... 370/252–463; 455/450–466
See application file for complete search history.

(56) References Cited

U.S. PATENT DOCUMENTS

| | | | | |
|---|---|---|---|---|
| 7,505,783 | B2 * | 3/2009 | Park et al. | 455/552.1 |
| 7,826,859 | B2 * | 11/2010 | Lee et al. | 455/458 |
| 8,068,843 | B2 * | 11/2011 | Yi et al. | 455/450 |
| 8,160,590 | B2 * | 4/2012 | Mueck et al. | 455/444 |
| 8,233,922 | B2 * | 7/2012 | Petrovic et al. | 455/458 |
| 8,238,948 | B2 * | 8/2012 | Trogolo et al. | 455/466 |
| 2003/0035403 | A1 | 2/2003 | Choi et al. | |
| 2004/0103435 | A1 * | 5/2004 | Yi et al. | 725/81 |
| 2006/0240766 | A1 | 10/2006 | Wilde | |
| 2007/0049344 | A1 * | 3/2007 | Van Der Velde et al. | 455/560 |
| 2008/0039083 | A1 * | 2/2008 | Muniere et al. | 455/434 |
| 2008/0200171 | A1 * | 8/2008 | Jeong et al. | 455/436 |
| 2008/0280631 | A1 * | 11/2008 | Lee et al. | 455/458 |
| 2009/0098892 | A1 * | 4/2009 | Trogolo et al. | 455/466 |
| 2009/0280823 | A1 * | 11/2009 | Petrovic et al. | 455/453 |

(Continued)

FOREIGN PATENT DOCUMENTS

| | | |
|---|---|---|
| CN | 1371576 A | 9/2002 |
| CN | 1496658 A | 5/2004 |
| EP | 1 276 342 A1 | 1/2003 |

OTHER PUBLICATIONS

PCT International Search Report, dated Sep. 15, 2008, in connection with International Application No. PCT/EP2007/063992.

(Continued)

*Primary Examiner* — Ayaz Sheikh
*Assistant Examiner* — Venkatesh Haliyur
(74) *Attorney, Agent, or Firm* — Potomac Patent Group PLLC

(57) ABSTRACT

A method of controlling user equipment in a wireless communications network, the method comprising: producing different system information for different groups of user equipment based on characteristics of the user equipment, sending the system information to said user equipment, and indicating to which group of the user equipment the system information is addressed.

9 Claims, 6 Drawing Sheets

(56) References Cited

U.S. PATENT DOCUMENTS

2011/0019615 A1* 1/2011 Krco et al. .................. 370/328
2011/0205995 A1* 8/2011 Grovlen ...................... 370/329
2011/0243090 A1* 10/2011 Grovlen et al. ............. 370/329
2011/0305211 A1* 12/2011 Lunttila et al. .............. 370/329

OTHER PUBLICATIONS

3GPP Technical Specification TS 25.331, Version 7.6.0, Release 7, Sep. 2007.
NTT DOCOMO Inc. "Transmission methods of scheduling information R2-063388" 3GPP TS-RAN WG 2 #56, Oct. 10, 2006, pp. 1-3, XP002494519. Retrieved from the Internet: URL: www.3gpp.org.
3GPP Technical Specification 25.331, Third Generation Partnership Project, Universal Mobile Telecommunications System (UTMS); Radio Resource Control (RRC); Protocol Specification, V6.14.0, Release 6, Jun. 2007.
Chinese Office Action, dated Sep. 29, 2012, in connection with counterpart Chinese Patent Application 200780101936.1 (See Translation below).
Translation of Chinese Office Action, dated Sep. 29, 2012, in connection with counterpart Chinese Patent Application 200780101936.1.
3GPP TS 25.433, V6.15.0 Technical Specification Group Radio Access Network; UTRAN lub interface Node B Application Part (NBAP) signalling, Release 6, Sep. 2007.

* cited by examiner

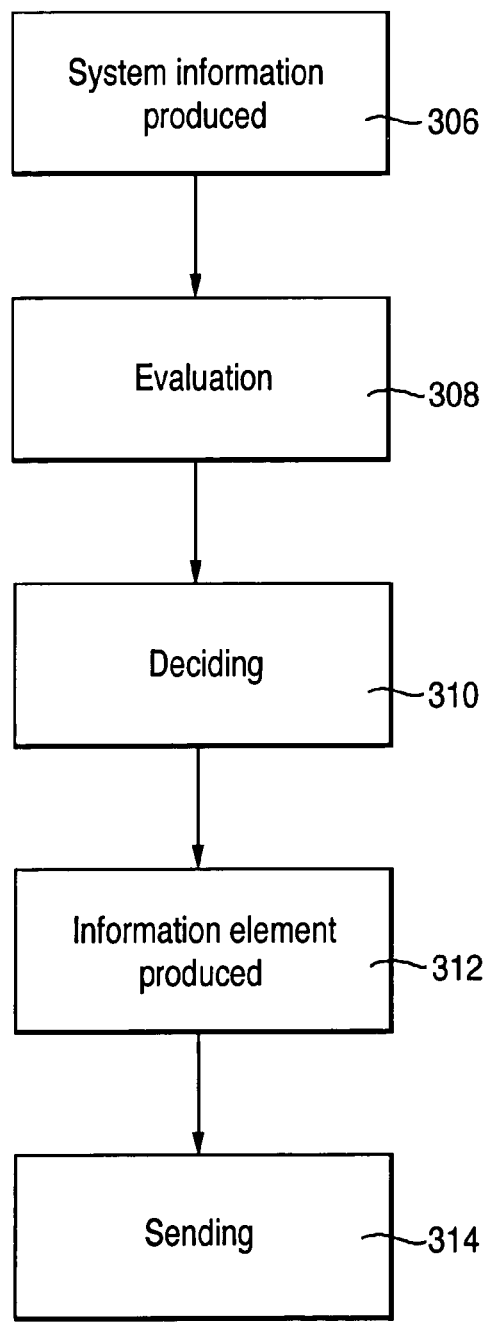

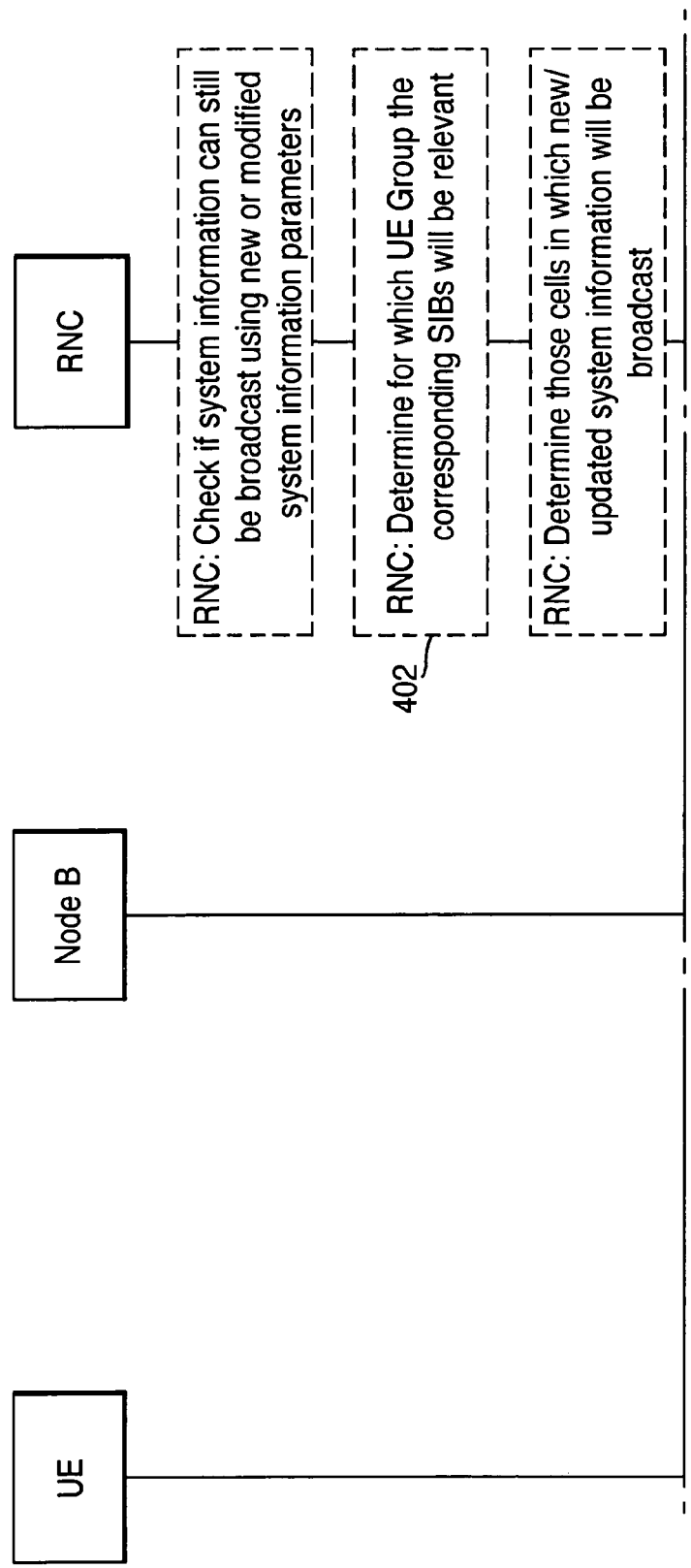

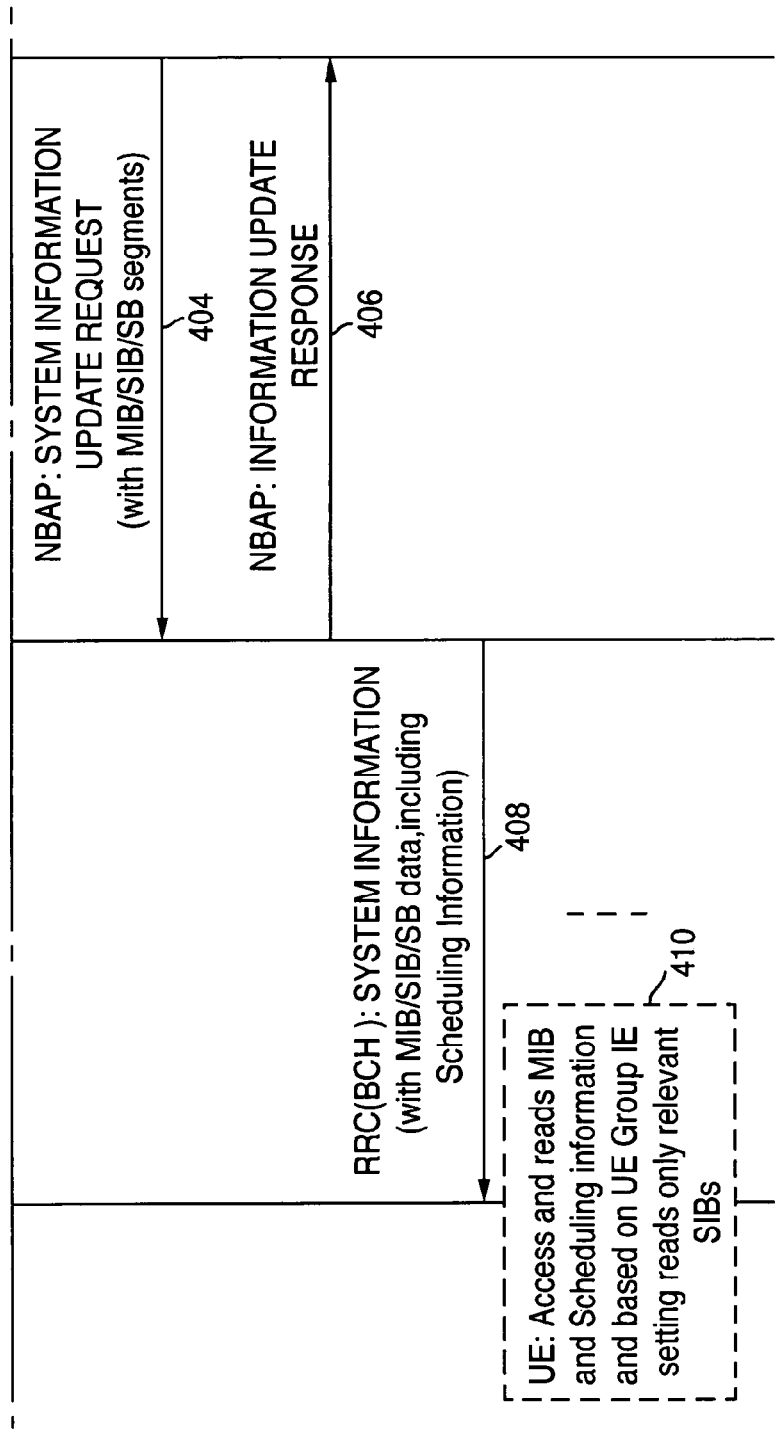

DELIVERING SYSTEM INFORMATION IN WIRELESS COMMUNICATIONS NETWORK

TECHNICAL FIELD

The present invention relates to wireless telecommunications networks, in general, and in particular to delivering system information to user equipment operating in a wireless telecommunications network.

BACKGROUND

In order to distribute important system parameters required by user equipment UE (also known as mobile stations or subscribers) for it to properly access the system, the network broadcasts these parameters in information blocks. The information sent by the network to the UE concerns parameters involved in cell selection and reselection, measurement management, location and routing registration, handover, power controls, etc. One master information block (MIB) and a number of system information blocks (SIBs) are defined by 3GPP in document 3GPP TS 25.331.

All blocks are broadcast over the air interface via a Broadcast Control Channel (BCCH) (BCH). Broadcast Control Channel (BCCH) is a logical channel and a Broadcast Channel (BCH) is a transport channel. BCCH is mapped to BCH. A MIB gives references and scheduling information to a number of system information blocks in a cell. The master information block may also contain references to a scheduling block (SB) which contains scheduling information related to additional system information blocks in the cell as illustrated in FIG. 1. The scheduling information helps the user equipment to find and read the referred SIB or SB.

The system information blocks contain the actual system information applicable for different WCDMA RAN (Wideband Code Division Multiple Access Radio Access Network) functionalities. System information is broadcast to user equipment in a series of system information blocks. A SIB groups together system information elements of the same nature. Different SIBs may have different characteristics and rules of their transmissions e.g. regarding their repetition rate, initial position on a transport channel and the requirements on UEs to re-read the system information blocks. The SIBs contain all information necessary for UEs to work properly in both idle and connected mode.

The main disadvantage of this known solution is that all UEs in one cell (also known as mobile stations or subscribers) receive exactly the same information (i.e. system parameters) and some of them receive information they do not need, whereas some do not receive information they need.

SUMMARY

It is the object of the present invention to obviate at least some of the above disadvantages and provide an improved network node and method for controlling user equipment in a wireless communications network.

Accordingly, the invention seeks to preferably mitigate, alleviate or eliminate one or more of the disadvantages mentioned above singly or in any combination.

According to a first aspect of the present invention there is disclosed a method of controlling user equipment in a wireless communications network. The method comprises producing different system information for different groups of user equipment based on characteristics of the user equipment, sending the system information to said user equipment, and indicating to which group of the user equipment the system information is addressed.

According to a second aspect of the present invention there is disclosed a network node for use in a wireless communications network comprising a plurality of user equipment located in at least one cell. The network node comprises a function for producing different system information for different groups of said user equipment based on characteristics of the user equipment and for indicating to which group of the user equipment the system information is addressed and a sender for sending the system information and said indication to said user equipment.

According to a third aspect of the present invention there is provided a wireless communications network comprising a first plurality of network nodes and a second plurality of user equipment. The nodes are adapted to control the user equipment by sending to said user equipment system information, and the user equipment belongs to at least one of at least two groups, wherein allocation to a group is based on characteristics of said equipment. At least one of said nodes is adapted to produce different system information for different groups of said user equipment, and to send the system information to said user equipment with an indication to which group of the user equipment the system information is addressed.

Further features of the present invention are as claimed in the dependent claims.

The advantages of the present invention include using different SIBs for different groups of UEs in order to tailor the network parameters based on the way in which the user equipment is used. It is a flexible solution in which the number of categories of specific information related to operational characteristics of the UE (e.g. transport channel types or cell selection/reselection mechanisms) can be set at different levels for different UEs as not all of this information is needed by all UEs. The user equipment shall skip reading the system information block not applicable to its group and shall skip monitoring changes to this SIB which will save the battery power. Additionally, present invention will not impact the legacy networks and UEs.

BRIEF DESCRIPTION OF THE DRAWINGS

The present invention will be understood and appreciated more fully from the following detailed description taken in conjunction with the drawings in which:

FIG. 3 is a diagram illustrating a method of controlling user equipment in a wireless communications network in an alternative embodiment of the present invention;

FIG. 4 is a message sequence chart illustrating a method of controlling user equipment in a wireless communications network in one embodiment of the present invention;

DETAILED DESCRIPTION

The term "communications network" herein below refers to a network adapted for transmission and reception of voice, video or multimedia as well as data. The evolution of communications networks from transmission of voice only to transmission of various media and data is known and today's telephone networks (mobile and fixed wireline) are also used for transmission of data (e.g. internet service provided using DSL technology over fixed wireline or GPRS over radio).

The invention is based on the fact that the user equipment is used in different ways, in different circumstances and serves different purposes, which is referred in this document as characteristics of the user equipment. The simplest example showing the differences is a mobile phone used by a person and a communication device installed in a vending machine and subscribed to the same network as the mobile phone. The mobile phone moves with its user and needs handover data, the vending machine does not move and does not need handover data. In the existing solutions, however, there is no differentiation between different UEs and all UEs are given the same set of system parameters.

In one embodiment of the present invention mobility of the UE is an important factor that determines the information the UE receives. Differentiation between mobile and stationary UE is the most basic one. In an alternative embodiment the mobile subscribers could be further subdivided. For high speed services it is important to know if the UE is located in a high speed train or in a car as it impacts RAN performance and utilization (e.g. establishment of Signalling Radio Bearers (SRBs) on HS-DSCH (High Speed Downlink Shared Channel) as part of fast call setup) and therefore a specially designed set of parameters should be sent to such fast moving UE. In other, alternative embodiments, there could be other factors deciding on assignment of a particular UE to a particular group.

As explained in the background section the master information block gives references and scheduling information to a number of system information blocks in a cell and also may contain references to a scheduling block.

Figure 1:
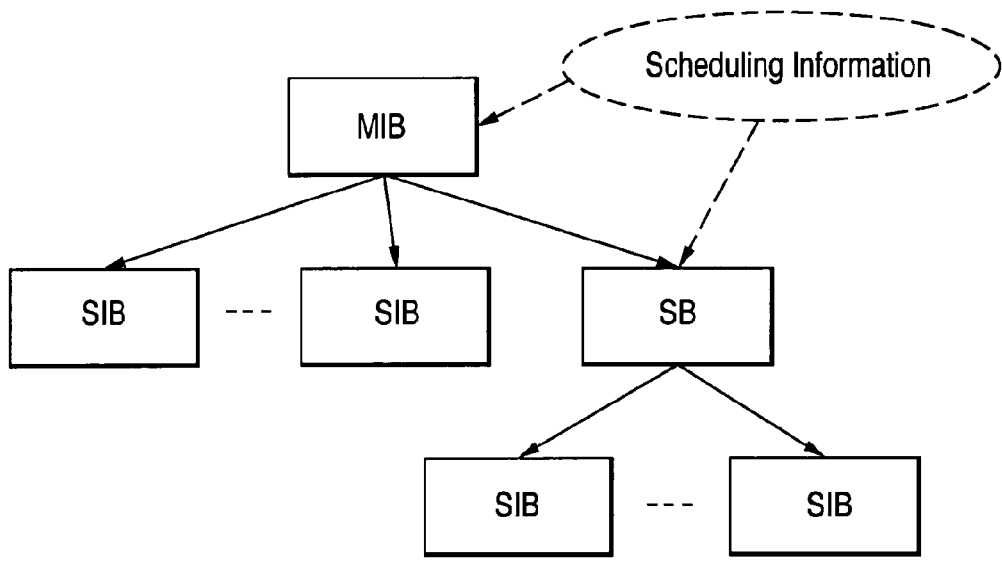
FIG. 1 is a diagram illustrating structure of a Master Information Block.
Figure 2:
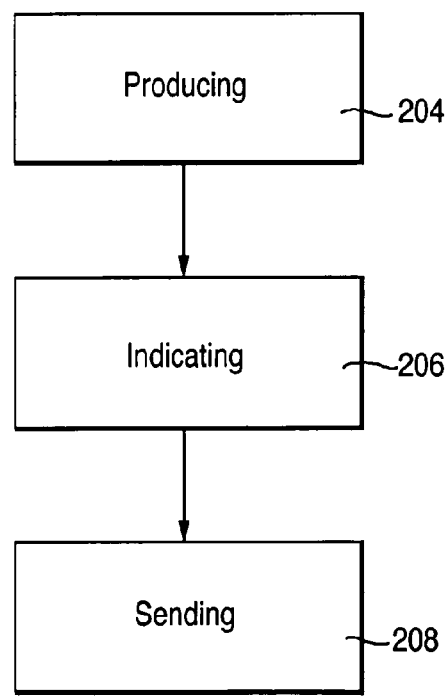
FIG. 2 is a diagram illustrating a method of controlling user equipment in a wireless communications network in one embodiment of the present invention.

With reference to FIG. 2 and FIG. 3 embodiments of the method in accordance with the present invention are discussed in the context of a Radio Network Controller operating in WCDMA network. It is, however, only one possible implementation of the present invention and it could be equally applied to, for example, eNodeB in LTE (Long Term Evolution) network.

In one embodiment of the present invention illustrated in FIG. 2 Radio Network Controller (RNC) produces, 204, different system information for the user equipment belonging to different groups. The user equipment belongs to a group based on its characteristics. The invention introduces an information element (IE)—the group IE designed for one group of user equipment. The purpose of the group IE is to indicate 206 to which group of UE the system information is applicable (addressed).

In one embodiment the group IE is a sub-information element of the Scheduling Information IE inside a Master Information Block that is produced 204 by a Radio Network controller (RNC) and used to distribute scheduling and validity information for all system information blocks to the user equipment. The MIB with all its system information and the group IE is sent 208 from the RNC to the user equipment. As a new filtering mechanism, the group IE indicates to which group of user equipment the information in a system information block (SIB) is applicable. In one embodiment a message can be added under one of the SBs that will show the Group IE.

In one embodiment different values are defined 206 to designate at least two different groups of UEs: static and mobile. Each UE will determine its mobility based on available local information (for example, using built in acceleration sensors and/or GPS information) or even as a built-in characteristic of UE (e.g. for some stationary servers, static/semi-static monitoring equipment e.g. in vending machines). Based on the determined or pre-defined mobility pattern, each UE will use appropriate system information blocks defined by Scheduling Information IE and the group IE as the indicator of the UE group. In general, the majority of the existing SIBs will not be relevant or will be applied in the specific occasions for the UEs that belong to the static group or even to the mobile group.

The group IE allows distributing system information blocks to specific groups of UEs in a cell or even in PLMN (public land mobile network). This information element is included 206 as a part of the Scheduling Information in a MIB and refers to a certain group of UEs for which the scheduled system information block is applicable.

If the system information contained in a SIB is applicable to all UE groups then the group IE is not included in the Scheduling Information IE that refers to the corresponding SIB type.

In one possible implementation of the present invention UE groups are defined based on mobility pattern of the user equipment and two basic values are proposed: static and mobile. However, in alternative embodiments the value of the group IE can have more values, e.g. static, low-speed mobility, high-speed mobility, etc. In yet another alternative embodiment the group IE can also be based on the UE function (or purpose), e.g. data only, TV only, sensor-based monitoring equipment, multimedia centre, etc. It is also envisaged that user equipment can be a member of more than one group, e.g. static and data only or mobile and TV only, etc.

If one SIB is applicable to multiple UE groups then group IE can be defined as a list of UE groups.

The structure of the Scheduling Information IE in a MIB including the group IE 'UE Group' is shown in the table below.

| MASTER INFORMATION BLOCK | | |
|---|---|---|
| Information Element | Presence | Comments |
| | Other IEs as in 3GPP 25.331 | |
| References to other system information blocks and scheduling blocks | Present (MP) | |
| >References to other system information blocks and scheduling blocks | Present (MP) | Depends on how many SIBs it refers |
| 2 > Scheduling information | Present (MP) | |
| 3 > CHOICE Value tag | Conditional (OP) | Different values can be chosen, |

MASTER INFORMATION BLOCK

| Information Element | Presence | Comments |
|---|---|---|
| | Other IEs as in 3GPP 25.331 | |
| | | as Cell Value, PLMN Value. But only one is selected. |
| 4 > PLMN Value tag | Present (MP) Integer (1 ... 256) | If PLMN Value is set then only SIB 1 is referred. |
| 4 > Cell Value tag | Present (MP) Integer (1 ... 4) | If Cell Value is set then other SIB types are referred |
| 3 > UE Group | Conditional (OP) | Set to the value: Static or Mobile (as an example in this invention), The referred SIB type is applicable only for defined UE Group. Not present then all UE Groups will use the referred SIB Type. |
| 3 > Scheduling | Present (MP) | |
| 4 > SEG_COUNT | Conditional (MD) | Number of segments for referred SIB . Not present if only one segment is contained. |
| 4 > SIB_REP | Present (MP) | Repetition period for referred SIB |
| 4 > SIB_POS | Present (MP) | Position of the first segment referred SIB. |
| 4 > SIB_POS offset info | Conditional (MD) | Offset of the subsequent segments in ascending index order for referred SIB. Not present if only one segment is contained. |
| 2 > SIB and SB type | Present (MP) | Set to the referred SIB/SB type |

The method in a preferred embodiment of the present invention is presented using flow-chart (FIG. 3) and a message sequence chart (FIG. 4). In the message sequence chart of FIG. 4 the information flow between different WCDMA RAN nodes and UEs using the group IE is presented.

When the System Information Blocks are produced 306 the RNC evaluates 308, 402 the SIBs in order to determine for which UE group the corresponding SIBs are relevant.

The radio network controller sends 404 NBAP message SYSTEM INFORMATION UPDATE REQUEST to a Node B (which is a radio base station—RBS in a WCDMA network). This message contains the updated or new MIB, SB and/or SIBs as well as the relevant scheduling information. In this embodiment the RNC checks 308, 402 if the corresponding SIBs are relevant to one or more UE groups. When based on the evaluation it is decided 310 to which group of UE the particular SIB is relevant the RNC produces and includes 312 the group IE as part of the Scheduling Information, which is then sent 314 towards the UE.

Node B processes the message and schedules the System Information in accordance with the received scheduling information. Node B also performs concatenation of the SIBs and/or SIB segments into a single SYSTEM INFORMATION message. At the same time, Node B returns the NBAP message 406 SYSTEM INFORMATION UPDATE RESPONSE to the radio network controller.

Node B broadcasts 408 the new MIB and SIBs via RRC message SYSTEM INFORMATION. The System Information message contains one MIB, it can contain SIBs, or if none of the SIBs have been scheduled for a certain transmission time interval (TTI), then the message contains only system frame number (SFN) and padding (Padding is a string of 1 or 0 which is included to fill out the required length if there is no useful information to do that. It is ignored at the reception.)

UE accesses and reads 410 a MIB where all Scheduling Information including the group IE is defined. Based on the UE group, the UE reads the relevant SIBs only. For example, static UE accesses and reads SIBs that are defined only for the static UE group or for all types of UE (i.e. when group IE is not present in the Scheduling Information).

Figure 5:
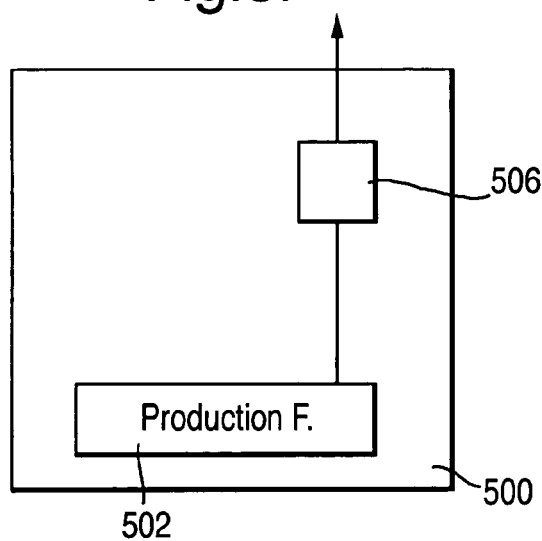
FIG. 5 is a diagram illustrating a network node in one embodiment of the present invention.

With reference to FIG. 5 a radio network controller 500 in one embodiment of the present invention is presented. The RNC 500 comprises a system information generator 502, which produces the system information contained in a Master Information Block and indicates (using group IE) to which group of the user equipment the system information is addressed. The generator produces different system information for different groups of user equipment. The user equipment belongs to a group based on characteristics of the user equipment. In the example given earlier mobile user equipment belongs to one group and static user equipment belongs to another group. The RNC further comprises a sender 506 for sending the system information and said indication to said user equipment. The sender 506 of the RNC in different embodiments may use different physical links to the remaining elements of the communications network and the user equipment and depending on the network design, terrain configuration it can be a radio, copper or fibre optics link, or a combination of these links. In this embodiment the generator 502 is programmed to produce system information for static user equipment and this information does not contain elements related to handover. The generator 502 is also programmed to produce system information comprising elements relevant to handover procedure and this is addressed to mobile user equipment.

In an alternative embodiment (not illustrated) the radio network controller in addition to elements illustrated in FIG. 5 comprises a register for storing information about the different groups of user equipment in the network. Using the information from the register the generator produces different system information for different groups of user equipment. The advantage of using the register is that its content (i.e.

information about the groups of user equipment) can be modified by the network administrator and if a new use-case is created, which would benefit from system information specifically designed for this use-case a new group of user equipment is created and added to the register. Using information about this new group the generator produces system information tailored for the new group.

Figure 6:
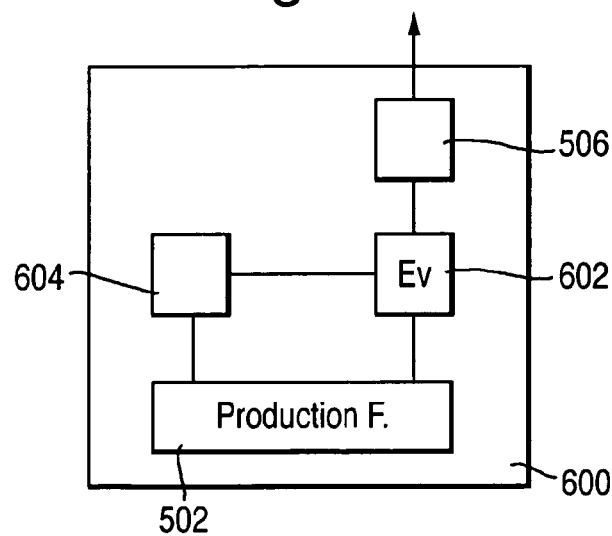
FIG. 6 is a diagram illustrating a network node in an alternative embodiment of the present invention.

In an alternative embodiment illustrated in FIG. 6 the network node 600 (e.g. radio network controller), in addition to elements from FIG. 5, comprises an evaluation unit 602, and a register 604. The register 604 stores information about different groups of the user equipment and the groups are defined based on characteristics of the user equipment as explained earlier. The evaluation unit 602 receives information from the register 604 and from the system information generator 502. Based on this information the evaluation unit 602 evaluates 308 the system information and decides 310 to which of the groups of the user equipment particular system information is addressed and produces the group IE 312, which provides the user equipment with the indication required to read and process only the system information which is relevant to the UE group this particular user equipment is a member. As in the previous embodiment the system information and the group IE is sent by the sender 506.

Figure 7:
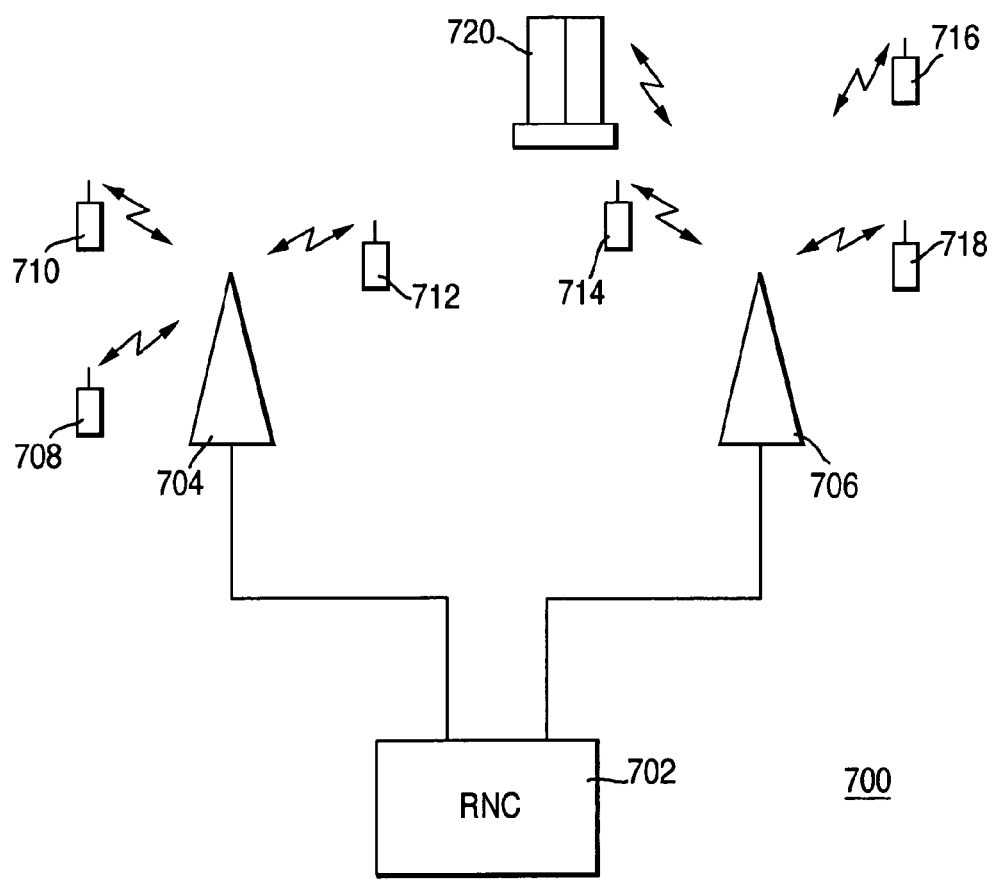
FIG. 7 is a diagram illustrating a wireless communications network in one embodiment of the present invention.

With reference to FIG. 7 one embodiment of a wireless communications network 700 is presented. The network 700 comprises a first plurality of network nodes 702-706, which are Radio Network Controller 702 and two Nodes B 704 and 706. The network 700 also comprises a second plurality of user equipment 708-720. Some of the user equipment is fully mobile (e.g. mobile phones) 708-718 and there is one example of a static user equipment 720, which is a communication module in a vending machine. The nodes 702-706 controls the user equipment 708-720 by sending to said user equipment system information. The user equipment is grouped into at least two groups based on characteristics of said equipment and at least one of said nodes 702 produces system information for said user equipment 708-720. The system information is send to said user equipment with an indication to which group of the user equipment the system information is addressed. The radio network controller 702 builds the content of the system information and defines how it should be sent. The Nodes B 704, 706 use this information to include and build correct BCH and a physical channel and send the information to the user equipment according to how the RNC 702 orders.

The invention claimed is:

1. A method of controlling user equipment in a wireless communications network, the method comprising:
   producing different system information for different groups of user equipment based on characteristics of the user equipment;
   sending the system information to said user equipment; and
   indicating to which group of the user equipment the system information is addressed,
   wherein, said step of producing comprises including mobility of the user equipment in a group information element of scheduling information inside a Master Information Block,
   wherein the method further comprises:
   sending the system information in a System Information Block, wherein the System Information Block is part of said Master Information Block and including said information element in said Master Information Block; and
   evaluating the System Information Blocks and deciding to which of the groups of the user equipment particular System Information Block is applicable.

2. The method according to claim 1, comprising sending an information element including the indication to which group of the user equipment the system information is addressed.

3. The method according to claim 1, wherein, in said step of producing, function of the user equipment is considered.

4. The method according to claim 1, wherein the information element identifies more than one group of user equipment to which the particular system information is addressed.

5. A network node for use in a wireless communications network comprising a plurality of user equipment located in at least one cell and the network node comprises:
   a function for producing different system information for different groups of said user equipment based on characteristics of the user equipment and for indicating to which group of the user equipment the system information is addressed;
   a sender for sending the system information and said indication to said user equipment; and
   an evaluation unit configured to evaluate the system information and decide to which of the groups of the user equipment particular system information is addressed,
   wherein, said function for producing comprises a function that includes mobility of the user equipment in a group information element of scheduling information inside a Master Information Block.

6. A network node comprising a register for storing information about different groups of the user equipment, wherein the groups are defined based on characteristics of the user equipment.

7. The network node according to claim 5, configured to send the system information in a System Information Block, wherein the System Information Block is part of said Master Information Block and to include said information element in said Master Information Block.

8. The network node according to claim 5, wherein the network node is a Radio Network Controller or eNodeB.

9. A wireless communications network comprising:
   a first plurality of network nodes; and
   a second plurality of user equipment,
   wherein the nodes are configured to control the user equipment by sending to said user equipment system information, and the user equipment belongs to at least one of at least two groups, wherein allocation to a group is based on characteristics of said equipment and at least one of said nodes is configured to produce different system information for different groups of said user equipment and to evaluate the system information and decide to which of the groups of the user equipment particular system information is addressed, and to send the system information to said user equipment with an indication to which group of the user equipment the system information is addressed,
   wherein, said producing of different system information for different groups of said user equipment comprises including mobility of the user equipment in a group information element of scheduling information inside a Master Information Block.

* * * * *